United States Patent
Tsuzuki et al.

(10) Patent No.: US 7,725,486 B2
(45) Date of Patent: May 25, 2010

(54) INFORMATION RETRIEVAL APPARATUS

(75) Inventors: Takashi Tsuzuki, Osaka (JP); Hiroshi Kutsumi, Osaka (JP); Eiichi Naito, Kyoto (JP)

(73) Assignee: Panasonic Corporation, Osaka (JP)

( * ) Notice: Subject to any disclaimer, the term of this patent is extended or adjusted under 35 U.S.C. 154(b) by 244 days.

(21) Appl. No.: 11/385,751

(22) Filed: Mar. 22, 2006

(65) Prior Publication Data

US 2006/0167918 A1    Jul. 27, 2006

Related U.S. Application Data

(63) Continuation of application No. PCT/JP2005/018461, filed on Oct. 5, 2005.

(30) Foreign Application Priority Data

Oct. 29, 2004  (JP)  ............... 2004-315483

(51) Int. Cl.
  G06F 7/00  (2006.01)
  G06F 17/30  (2006.01)
(52) U.S. Cl. .................................. 707/767
(58) Field of Classification Search .............. 707/4, 707/5, 6
  See application file for complete search history.

(56) References Cited

U.S. PATENT DOCUMENTS

| | | | |
|---|---|---|---|
| 5,905,980 A | 5/1999 | Masuichi et al. ............. 707/1 |
| 6,070,160 A * | 5/2000 | Geary ......................... 707/4 |
| 6,266,649 B1 * | 7/2001 | Linden et al. .............. 705/26 |
| 6,615,208 B1 * | 9/2003 | Behrens et al. .............. 707/5 |
| 6,687,696 B2 * | 2/2004 | Hofmann et al. ............. 707/6 |
| 6,701,310 B1 | 3/2004 | Sugiura et al. ............... 707/5 |
| 2005/0198068 A1 * | 9/2005 | Mukherjee et al. ...... 707/104.1 |

FOREIGN PATENT DOCUMENTS

| | | |
|---|---|---|
| JP | 8-030630 | 2/1996 |
| JP | 9-097256 | 4/1997 |
| JP | 9-190451 | 7/1997 |
| JP | 10-134075 | 5/1998 |
| JP | 10-143521 | 5/1998 |
| JP | 2000-348042 | 12/2000 |
| JP | 2001-188802 | 7/2001 |
| JP | 2003-271631 | 9/2003 |

OTHER PUBLICATIONS

Kazuko Kuriyama, "Query Expansion Using Thesauri", vol. 98, No. 109, IPSJ SIG Notes, pp. 1-8, Nov. 30, 1998 (Japanese publication with English Abstract).

* cited by examiner

*Primary Examiner*—Mohammad Ali
*Assistant Examiner*—Alexey Shmatov
(74) *Attorney, Agent, or Firm*—Wenderoth, Lind & Ponack, L.L.P.

(57) ABSTRACT

An information retrieval apparatus using a preference-based association dictionary, having words stored therein that are dynamically changed according to user's preferences, and using a general association dictionary storing a relationship between keywords included in a database. The apparatus includes: a matching unit which calculates a degree of matching between a search condition inputted from an input unit and a profile; a generation unit which obtains (i) one or more related words from a general association dictionary in a case where the matching degree is smaller than a predetermined threshold, and (ii) one or more related words from a preference-based association dictionary in a case where the matching degree is greater than the predetermined threshold; and a retrieval unit which retrieves information that meets the generated search condition.

11 Claims, 12 Drawing Sheets

FIG. 2

| Label | Data | Wight value |
|---|---|---|
| <genre> | drama | 80 |
| <genre> | news | 30 |
| <person's name> | Taro Matsushita | 80 |
| <person's name> | Hanako Matsushita | 70 |
| <person's name> | Ichiro Matsushita | 60 |
| <airtime> | 12:00−13:00 | 90 |
| : | : | : |

FIG. 3

| Related word 1 | Related word 2 | Related word 3 | Related word 4 | ... |
|---|---|---|---|---|
| drama | Taro Matsushita | Hanako Matsushita | Goro Matsushita | |
| variety | Taro Matsushita | Jiro Matsushita | stand-up comic | |
| historical drama | Ichiro Matsushita | | | |
| ∴ | ∴ | ∴ | ∴ | ∴ |

FIG. 4

| Related word 1 | Related word 2 | Related word 3 | Related word 4 | ... |
|---|---|---|---|---|
| drama | Taro Matsushita | Hanako Matsushita | | |
| Taro Matsushita | Ichiro Matsushita | | | |

FIG. 6

| Situation keyword | Emotion keyword | Label | Data | Wight value |
|---|---|---|---|---|
| living room | enjoyable | <genre> | drama | 80 |
| | | <genre> | variety | 70 |
| | | <person's name> | Taro Matsushita | 80 |
| | scared | <genre> | horror | 70 |
| | | <person's name> | Ichiro Matsushita | 60 |
| | .. | .. | .. | .. |
| bedroom | enjoyable | <genre> | movie | 90 |
| | | <person's name> | Goro Matsushita | 50 |
| | .. | .. | .. | .. |
| .. | | | | |

FIG. 7

Title : ○○○○○○
Genre : drama
Leading performer : Taro Matsushita
Story : ××××××××××××
　　　　×××××××××××
　　　　×××××××××××

| Related word 1 | Related word 2 | Association value |
|---|---|---|
| Taro Matsushita | Ichiro Matsushita | 80 |
| Taro Matsushita | Jiro Matsushita | 70 |
| Taro Matsushita | Saburo Matsushita | 50 |
| Taro Matsushita | Shiro Matsushita | 40 |
| Ichiro Matsushita | Jiro Matsushita | 60 |
| Ichiro Matsushita | Saburo Matsushita | 70 |
| Ichiro Matsushita | Shiro Matsushita | 20 |
| : | : | : |

FIG. 9

| Matching degree | Number of related words to be obtained |
|---|---|
| 100 − 149 | 1 |
| 150 − 199 | 3 |
| 200 − | 5 |

FIG. 10

| Related word 1 | Related word 2 | Association value |
|---|---|---|
| Taro Matsushita | Ichiro Matsushita | 25 |
| Taro Matsushita | Jiro Matsushita | 20 |
| Taro Matsushita | Saburo Matsushita | 30 |
| Taro Matsushita | Shiro Matsushita | 40 |
| Taro Matsushita | Goro Matsushita | 50 |
| Taro Matsushita | Rokuro Matsushita | 60 |
| Jiro Matsushita | Saburo Matsushita | 20 |
| : | : | : |

FIG. 11

| Matching degree | Number of related words to be obtained |
|---|---|
| −99 | 3 |
| 100−149 | 2 |
| 150−199 | 1 |
| 200− | 0 |

FIG. 13

| Related word 1 | Related word 2 | Association value |
|---|---|---|
| Jiro Matsushita | Taro Matsushita | 80 |
| drama | Hanako Matsushita | 70 |
| Taro Matsushita | Hanako Matsushita | 50 |

FIG. 14

| Related word 1 | Related word 2 | Association value |
|---|---|---|
| Taro Matsushita | Ichiro Matsushita | 80 |
| variety | Jiro Matsushita | 70 |
| variety | stand-up comic | 90 |
| ⋮ | ⋮ | ⋮ |

FIG. 16

| Jiro Matsushita |
|---|
|  |
|  |
|  |

FIG. 17

| Jiro Matsushita |
|---|
| Hanako Matsushita |
|  |
|  |

INFORMATION RETRIEVAL APPARATUS

CROSS REFERENCE TO RELATED APPLICATION

This is a continuation application of PCT application No. PCT/JP2005/018461 filed on Oct. 5, 2005, designating the United States of America.

BACKGROUND OF THE INVENTION (1) Field of the Invention

The present invention relates to an information retrieval apparatus which carries out information retrieval using association dictionaries which memorize associations between words included in information stored in a database.

(2) Description of the Related Art

Conventional methods for creating an association dictionary to be used for database retrieval include, for example, manually creating an association dictionary by examining relationships between words included in information stored in a database, and automatically creating an association dictionary using information about apparition frequency of words in an electronic text. As to a method of automatically creating an association dictionary based on the relationships between the words, various methods are under development.

One of the methods for using the association dictionaries thus created is, for example, in the case where information retrieval is performed by an information retrieval apparatus using a search keyword and no results are obtained, a keyword related to the search keyword is extracted using an association dictionary and information is retrieved again using the extracted keyword.

As such information retrieval apparatus, a text processor is disclosed as such that provides, as a support for an input of a search keyword, plural association dictionaries that store related words, allows the user to select one association dictionary among them for information retrieval, obtains, from the selected association dictionary, a related word relating to a keyword inputted by the user, and displays the related word (see reference to Japanese Laid-Open Application No. 10-134075). Also, an association dictionary creating apparatus is also disclosed as such that establishes a customized association dictionary to meet personal needs, and after an input of a search keyword, searches the search keyword in the customized association dictionary, and in the case where the search keyword is not found in the customized association dictionary, obtains one or more related words relating to the search keyword from an integrated association dictionary storing all of keywords, and presents the user with the related word (see reference to Japanese Laid-Open Application No. 2000-348042).

SUMMARY OF THE INVENTION

With the conventional text processor capable of allowing the user to select, for use, a dictionary that he/she desires to use from among plural association dictionaries, the user can select an appropriate association dictionary which is appropriate for the user's intended use, since the user knows the types of related words included in the association dictionary. However, in the case where a related word included in an association dictionary is dynamically changed according to a change in user's preferences, it is difficult for the user to appropriately use the association dictionary since the user cannot specify the type of a related word included in the association dictionary.

For example, in the case of using an apparatus which searches for a TV program using two types of association dictionaries: a general association dictionary created by calculating a degree of association between names of the cast members which are included in program information such as an electronic program listing transmitted via broadcast waves; and a preference-based association dictionary created by calculating, based on a degree of user's preferences, a degree of association between names of the cast members which reflect the user's preferences, the names of cast members to be stored into the preference-based association dictionary is added or deleted according to a change in the user's preferences. Thus, the user cannot know the names of cast members stored in the preference-based association dictionary. This imposes a great burden on the user as the user firstly refers to the preference-based association dictionary for obtaining the names of the cast members related to a specific cast member, and refers to the general association dictionary only after knowing that the name of the cast members which are related to the specific cast member and also satisfy the user's preferences are not in the preference-based association dictionary.

As for the association dictionary creating apparatus which can use both the conventional customized association dictionaries and the integrated association dictionary which stores all of keywords, the customized association dictionary is always used in the case where a search keyword is found in the customized association dictionary, so that it is not possible to appropriately use the both dictionaries according to a situation, taking account of a search context, a display content and a search scene.

For example, in the case of using an apparatus which searches for a TV program using two types of association dictionaries: a general association dictionary which stores relationships between words included in program information such as an electronic program listing transmitted via broadcast waves; and a preference-based association dictionary which stores relationships between the words included in the program information of user's favorite genre, it is difficult for the user to obtain an appropriate related word in an attempt to obtain the related words relating to a word included in the information of a TV program whose genre does not interest the user, because the genre preferred by the user is different from the genre of the program to be searched for.

The present invention is conceived in view of the above problems, and an object of the present invention is to provide an information retrieval apparatus which can use a preference-based association dictionary and a general association dictionary by adaptively switching between the two dictionaries, the preference-based association dictionary storing words which may be dynamically changed according to user's preferences, and the general association dictionary storing relationships between all the keywords included in a database.

In order to achieve the above object, the information retrieval apparatus according to the present invention retrieves information that meets a search request, from a database which stores information to be retrieved, and comprises: a general association dictionary storage unit which stores a relationship between words included in the information stored in the database; a preference-based association dictionary storage unit which stores a relationship between words which reflect user's preferences regarding the information stored in the database; a matching degree calculation unit which calculates a matching degree indicating a degree of matching between preference-based association dictionary characteristic information and information inputted by a user, the preference-based association dictionary characteristic information indicating a characteristic of a word stored in the preference-based association dictionary storage unit; a search condition generation unit which selects at least one of the general association dictionary storage unit and the preference-based association dictionary storage unit based on the matching degree, obtains a related word which is a word relating to the inputted information, from at least one of the selected general association dictionary storage unit and preference-based association dictionary storage unit, and generates a search condition using the obtained related word; and a retrieval unit which retrieves, from the database, information which meets the search condition generated by the search condition generation unit.

As described above, with the information retrieval apparatus according to the present invention, it is possible for the user to use the dictionary using a more appropriate search condition in a more appropriate search context, display content or search scene, in an attempt to obtain one or more related words using both a preference-based association dictionary and a general association dictionary in order to extend the range of search condition for inputted information. This can be achieved by calculating a degree of matching between preference-based association dictionary characteristic information indicating a characteristic of the preference-based association dictionary and the inputted information, and also by determining a situation of using the preference-based association dictionary based on the matching degree.

The disclosure of Japanese Patent Application No. 2004-315483 filed on Oct. 29, 2004, including specification, drawings and claims is incorporated herein by reference in its entirety.

The disclosure of the PCT application No. PCT/JP2005/018461 filed on Oct. 5, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 shows an example of a profile to be used by the information retrieval apparatus according to the first embodiment;

FIG. 3 shows an example of a general association dictionary to be used by the information retrieval apparatus according to the first embodiment;

FIG. 4 shows an example of a preference-based association dictionary to be used by the information retrieval apparatus according to the first embodiment;

FIG. 6 shows an example of a profile which stores situation keywords as well as emotion keywords, and is used by the information retrieval apparatus according to the first embodiment;

FIG. 7 shows an example of information displayed by a display unit of the information retrieval apparatus according to the first embodiment;

FIG. 8 shows an example of a preference-based association dictionary which stores association values to be used by the information retrieval apparatus according to the first embodiment;

FIG. 9 shows an example of a table which stores a relationship between a matching degree and the number of obtained related words associated with the matching degree, and which is used by the information retrieval apparatus according to the first embodiment;

FIG. 10 shows an example of a general association dictionary which stores association values to be used by the information retrieval apparatus according to the first embodiment;

FIG. 11 shows an example of a table which stores a relationship between a matching degree and the number of obtained related words associated with the matching degree, and which is used by the information retrieval apparatus according to the first embodiment;

FIG. 13 shows an example of a preference-based association dictionary to be used by the information retrieval apparatus according to the second embodiment;

FIG. 14 shows an example of a general association dictionary to be used by the information retrieval apparatus according to the second embodiment;

FIG. 16 shows an example of the contents held by an obtained-word storage unit which are to be used by the information retrieval apparatus according to the second embodiment; and FIG. 17 shows another example of the contents held by the obtained-word storage unit which are to be used by the information retrieval apparatus according to the second embodiment.

DETAILED DESCRIPTION OF THE INVENTION

Figure 1:
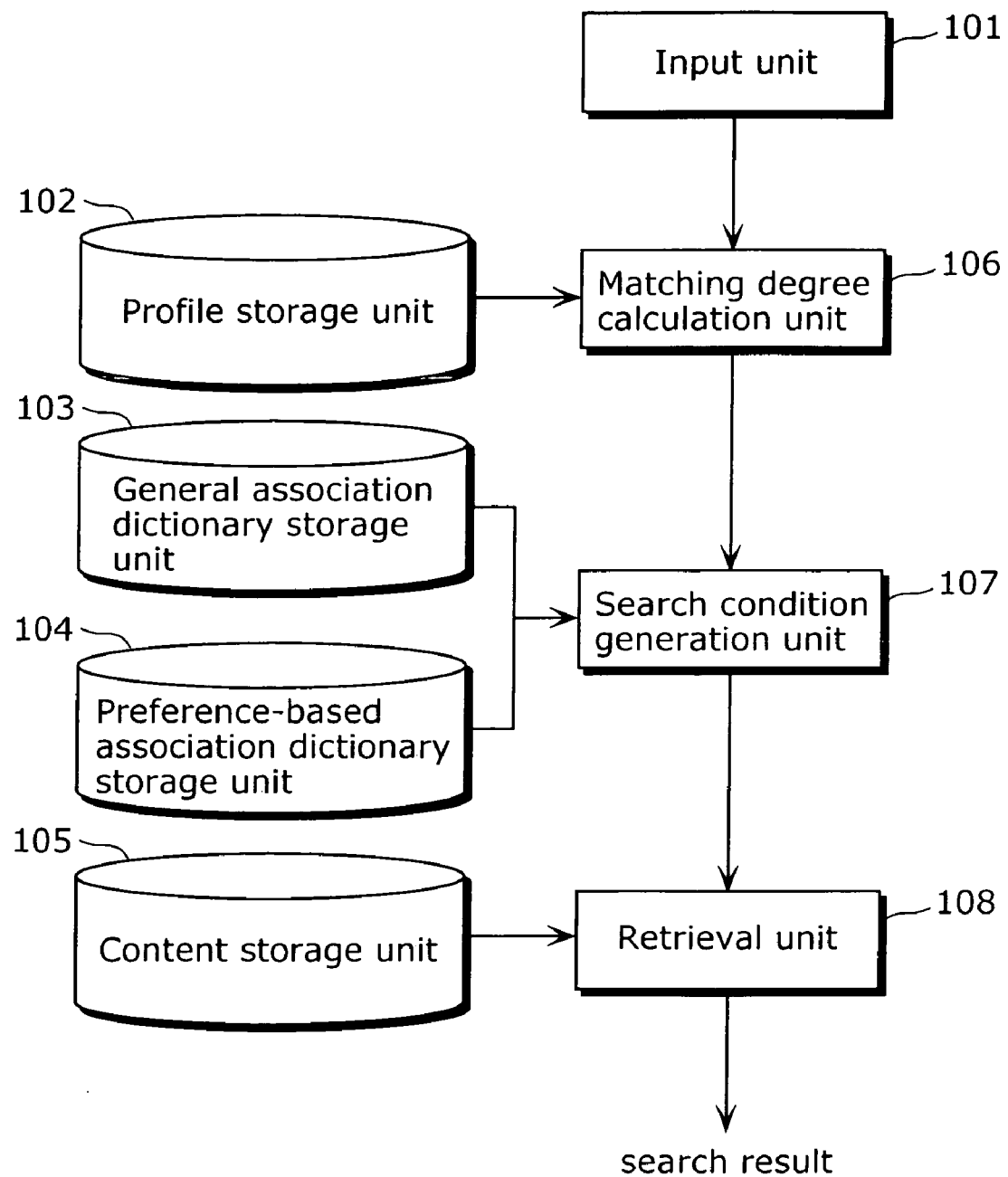
FIG. 1 is a block diagram showing a structure of an information retrieval apparatus according to a first embodiment of the present invention.

The information retrieval apparatus according to the present invention retrieves information that meets a search request, from a database which stores information to be retrieved, and comprises: a general association dictionary storage unit which stores a relationship between words included in the information stored in the database; a preference-based association dictionary storage unit which stores a relationship between words which reflect user's preferences regarding the information stored in the database; a matching degree calculation unit which calculates a matching degree indicating a degree of matching between preference-based association dictionary characteristic information and information inputted by a user, the preference-based association dictionary characteristic information indicating a characteristic of a word stored in the preference-based association dictionary storage unit; a search condition generation unit which selects at least one of the general association dictionary storage unit and the preference-based association dictionary storage unit based on the matching degree, obtains a related word which is a word relating to the inputted information, from at least one of the selected general association dictionary storage unit and preference-based association dictionary storage unit, and generates a search condition using the obtained related word; and a retrieval unit which retrieves, from the database, information which meets the search condition generated by the search condition generation unit.

Thus, it is possible to appropriately obtain one or more related words from at least one of the general association dictionary and the preference-based association dictionary, according to the inputted information.

The matching degree calculation unit may use a profile which is information relating to user's preferences, as the preference-based association dictionary characteristic information.

Thus, the preference-based association dictionary which reflects user's preferences has the same characteristic as that of the profile which is information relating to the user's preferences, so that the matching degree can be easily calculated based on the profile.

The matching degree calculation unit may use information previously retrieved by the retrieval unit, as the inputted information.

Thus, even in the case of using an apparatus which does not hold a profile such as an apparatus with which the user manually edits or creates a preference-based association dictionary, it is possible to use the general association dictionary and the preference-based association dictionary by adaptively switching between the two dictionaries according to the inputted information.

The matching degree calculation unit may use information previously retrieved by the retrieval unit, as the inputted information.

Thus, it is possible to use both the general association dictionary and the preference-based association dictionary while taking account of the search result previously displayed in the case where the user inputs a keyword included in the search result displayed in the previous retrieval, and in the case where the search result corresponds to the profile, it is possible to obtain one or more related words which reflect the user's preferences, from the preference-based association dictionary.

The search condition generation unit may select one of the general association dictionary storage unit and the preference-based association dictionary storage unit, based on a value of the matching degree, and obtain the related word from one of the selected general association dictionary storage unit and preference-based association dictionary storage unit.

Also, the search condition generation unit may obtain one or more related words depending on the number indicated by the value of the matching degree.

Moreover, the search condition generation unit may obtain one or more related words depending on the number indicated by the value of the matching degree, from the preference-based association dictionary storage unit and the general association dictionary storage unit.

The information retrieval apparatus according to the embodiments of the present invention retrieves information that meets a search request, from a database which stores information to be retrieved, and comprises: a general association dictionary storage unit which stores a relationship between words included in the information stored in the database; a preference-based association dictionary storage unit which stores, together with an association value, a relationship between words which reflect user's preferences regarding the information stored in the database, the association value being a value indicating a degree of association between the words; a preference related word obtainment unit which obtains, as a related word, a word whose association value with respect to inputted information indicates a predetermined threshold or greater, from the preference-based association dictionary storage unit, the inputted information being information inputted by the user, and the related word being a word relating to the inputted information, and decreases the predetermined threshold by a predetermined amount when receiving a search condition expansion command for requesting an expansion of a search condition; an unobtained related word judgment unit which judges whether or not an unobtained related word is obtained by the preference related word obtainment unit, in a case where the search condition expansion command is inputted, the unobtained related word being related to the inputted information; a general related-word obtainment unit which obtains the related word from the general association dictionary storage unit in a case where the unobtained related word judgment unit judges that the unobtained related word is not obtained; a search condition generation unit which generates a search condition using the unobtained related word, in a case where the unobtained related word judgment unit judges that the unobtained related word is obtained, and generates a search condition using the related word obtained by the general related word obtainment unit, in the case where the unobtained related word judgment unit judges that the unobtained related word is not obtained; and a retrieval unit which retrieves, from the database, information that meets the search condition generated by the search condition generation unit.

Thus, it is possible to decrease the predetermined threshold intended for the preference-based association dictionary in response to the search condition expansion command so as to obtain one or more related words from the preference-based association dictionary. Moreover, in the case of preferentially using the related words stored in the preference-based association dictionary and yet no related words can be obtained from the preference-based association dictionary, it is possible to obtain one or more related words using the general association dictionary.

The general association dictionary storage unit may store, together with the association value, the relationship between the words included in the information stored in the database; and the general related word obtainment unit obtains, as the related word, a word whose association value with respect to the inputted information indicates a predetermined threshold or greater, from the general association dictionary storage unit, and decreases the predetermined threshold by a predetermined amount in a case where the related word relating to the inputted information is obtained for the second time or more.

The program information retrieval apparatus according to the embodiments of the present invention retrieves program information that meets a search request, from a database which stores program information to be retrieved, and comprises: a general association dictionary storage unit which stores a relationship between words included in the program information stored in the database; a preference-based association dictionary storage unit which stores a relationship between words which reflect user's preferences regarding the program information stored in the database; a matching degree calculation unit which calculates a matching degree indicating a degree of matching between preference-based association dictionary characteristic information and inputted information, the preference-based association dictionary characteristic information indicating a characteristic of a word stored in the preference-based association dictionary storage unit, and the inputted information being inputted by the user; a search condition generation unit which selects at least one of the general association dictionary storage unit and the preference-based association dictionary storage unit, based on the matching degree, obtains a related word from at least one of the selected general association dictionary storage unit and preference-based association dictionary storage unit, the related word being a word relating to the inputted information, and generates a search condition using the obtained related word; and a retrieval unit which retrieves, from the database, program information which meets the search condition generated by the search condition generation unit.

Note that the present invention can be realized not only as the above-described information retrieval apparatus, but also as an information retrieval method which includes, as steps, the characteristic units equipped in the information retrieval apparatus, and even as a program that causes a computer to execute the steps. Such program can be surely distributed via a storage medium such as a CD-ROM and a transmission medium such as the Internet.

The following describes each of the embodiments for implementing the present invention, with reference to the diagrams.

First Embodiment

FIG. 1 is a block diagram showing a structure of an information retrieval apparatus according to the first embodiment of the present invention.

The information retrieval apparatus is an apparatus for retrieving information that matches a search request, from a database storing information to be retrieved, and includes an input unit 101, a profile storage unit 102, a general association dictionary storage unit 103, a preference-based association dictionary storage unit 104, a content storage unit 105, a matching degree calculation unit 106, a search condition generation unit 107 and a retrieval unit 108.

The input unit 101 is formed by an input apparatus such as a keyboard, a mouse and a remote control, and receives, from the user, a search condition which includes one or more search keywords or input data.

The profile storage unit 102 stores, for each user, a profile which is information relating to user's preferences. Such profile stores, for example, a genre of the user's favorite content, a favorite performer and a viewing time respectively with a weight value which indicates a degree of preference associated with the corresponding data (e.g., data relating to genre, performer and viewing time).

FIG. 2 shows an example of the profile stored in the profile storage unit 102. The profile stores a label indicating a type of data, data, and a weight value indicating a degree of user's preferences with respect to the data in such a manner that they are associated with each other. As shown in FIG. 2, the followings are the examples of a profile presented by (label, data, weight value): ((<genre>, drama, 80); (<genre>, news, 30); (<person's name>, Taro Matsushita, 80); (<person's name>, Hanako Matsushita, 70); (<person's name>, Ichiro Matsushita, 60); and (<broadcast time>, 12:00-13:00, 90).

The content storage unit 105 stores, for example, information related to a TV program and information related to a content stored in a hard disk recorder or the like.

The general association dictionary storage unit 103 stores a general association dictionary which presents a relationship between words included in the information stored in the content storage unit 105. The general association dictionary stores, for instance, a set of related words which are related to one another. FIG. 3 shows an example of the general association dictionary stored in the general association dictionary storage unit 103. As shown in FIG. 3, the followings are stored, as a set of related words, in the general association dictionary: (drama, Taro Matsushita, Hanako Matsushita, Goro Matsushita); (variety, Taro Matsushita, Jiro Matsushita, stand-up comic); and (historical drama, Ichiro Matsushita).

The preference-based association dictionary storage unit 104 stores a preference-based association dictionary indicating a relationship between words which reflect user's preferences regarding a plurality of words included in the information stored in the content storage unit 105. The preference-based association dictionary stores, for example, a word which is included in a profile and indicates a genre, a person's name or an airtime extracted from the information regarding a TV program viewed by the user, and one or more related words included in the information stored in the content storage unit 105, as a set. It is described that the word included in the profile shall be the word extracted from the information related to the TV program viewed by the user. However, it may be a user's favorite genre, person's name or airtime directly inputted by the user. FIG. 4 shows an example of the preference-based association dictionary stored in the preference-based association dictionary storage unit 104. The preference-based association dictionary stores, as shown in FIG. 4, the followings as a pair of words related to the preference-based association dictionary: (drama, Taro Matsushita, Hanako Matsushita); and (Taro Matsushita, Ichiro Matsushita).

The matching degree calculation unit 106 calculates a degree of matching between a search condition inputted from the input unit 101 and the preference-based association dictionary stored in the preference-based association dictionary storage unit 104. In this case, one or more search keywords included in a search condition is used as inputted information. Also, a preference-based association dictionary is created based on a profile stored in the profile storage unit 102, so that the profile is used as preference-based association dictionary characteristic information indicating a characteristic of a word stored in the preference-based association dictionary. Thus, the matching degree calculation unit 106 calculates a degree of matching between a search keyword included in the inputted search condition and the profile stored in the profile storage unit 102. In other words, the matching degree calculation unit 106 searches for a profile using the search keyword included in the inputted search condition, and derives a value to which a weight value assigned, within the profile, to the search keyword is added, as a matching degree. Note that although it has been described that the search keyword included in the search condition inputted from the input unit 101 shall be used as inputted information, the input information may also be specified by the user.

The search condition generation unit 107 selects a general association dictionary stored in the general association dictionary storage unit 103 or a preference-based association dictionary stored in the preference-based association dictionary storage unit 104 based on the matching degree calculated by the matching degree calculation unit 106. The search condition generation unit 107 then obtains one or more related words relating to the search keyword from the selected general association dictionary or preference-based association dictionary, and generates a search condition. In the case where the matching degree calculated by the matching degree calculation unit 106 is smaller than a predetermined threshold, the search condition generation unit 107 obtains one or more related words from the general association dictionary, and in the case where the matching degree is greater than the predetermined threshold, obtains one or more related words from the preference-based association dictionary.

The retrieval unit 108 obtains the information which meets the search condition generated by the search condition generation unit 107, and outputs the information as a search result.

Figure 5:
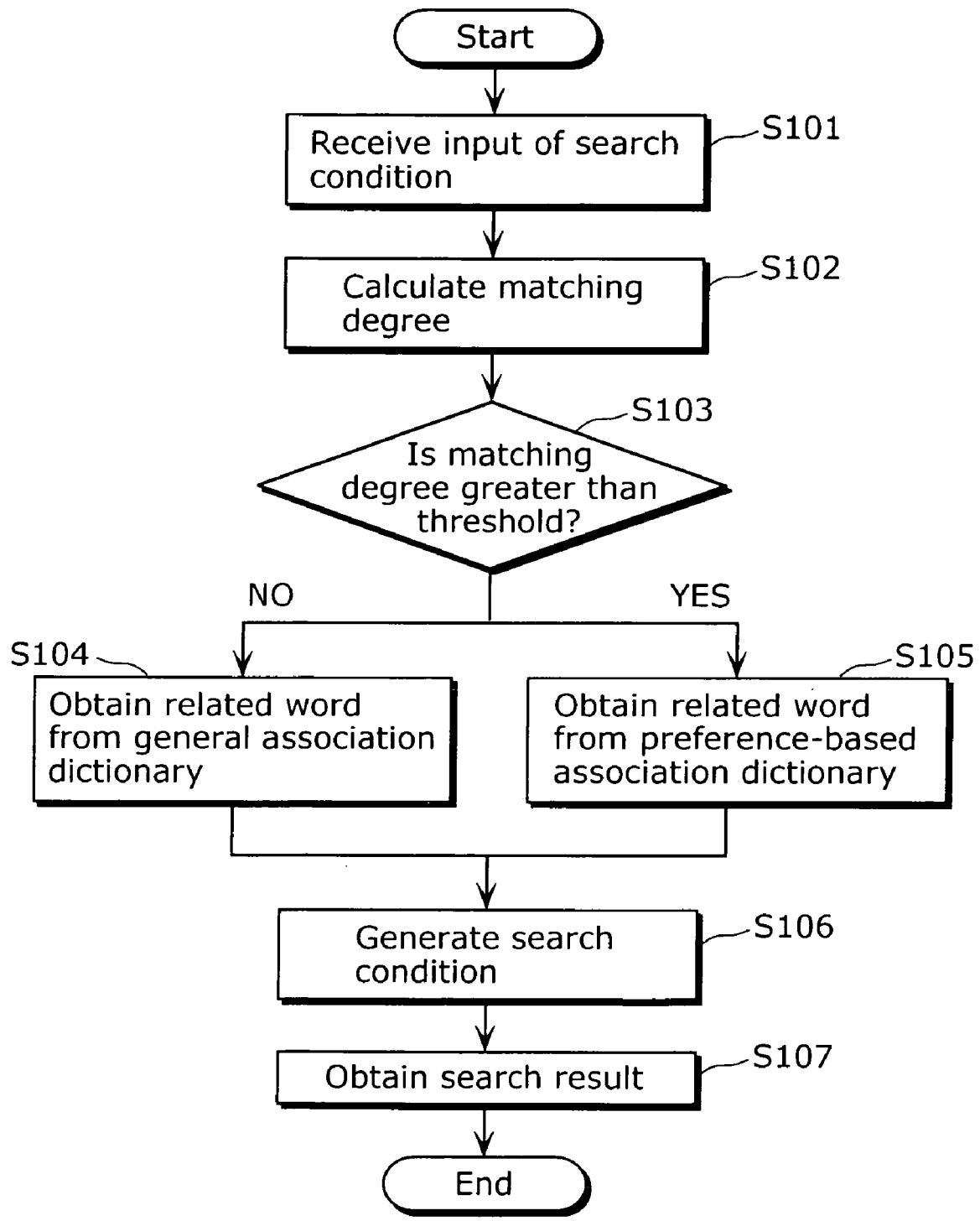
FIG. 5 is a flowchart showing a flow of the operation performed by the information retrieval apparatus according to the first embodiment.

The following describes the operation of the information retrieval apparatus according to the present embodiment. FIG. 5 is a flowchart showing a flow of the operation performed by the information retrieval apparatus.

When a search condition is inputted from the user, via the input unit 101, the matching degree calculation unit 106 receives the search condition (Step S101). Here, the two cases are taken as concrete examples: the case where the user inputs, via the input unit 101, "want to see a drama cast by Taro Matsushita" as a search condition; and the case where the user inputs "want to see a variety cast by Taro Matsushita" as a search condition.

The matching degree calculation unit 106 calculates a degree of matching between the received search condition and a profile stored in the profile storage unit 102 (Step S102). That is to say that the matching degree calculation unit 106 extracts a search keyword from the search condition inputted from the input unit 101, and in the case where the search keyword is found within the profile stored in the profile storage unit 102, calculates a degree of the matching between the search condition and the profile by adding a weight value of the search keyword. In the case where the inputted search condition is "want to see a drama cast by Taro Matsushita", the matching degree calculation unit 106 extracts a search keyword "Taro Matsushita, drama", adds a weight value "80" of "Taro Matsushita" and a weight value "80" of "drama" which are stored in the profile, and derives "160" as the matching degree. In the case where the inputted search condition is "want to see a variety cast by Taro Matsushita", the matching degree calculation unit 106 extracts search keyword "Taro Matsushita, variety", and derives "80" as the matching degree based only on the weight value "80" of "Taro Matsushita" stored in the profile.

Next, the search condition generation unit 107 judges whether the matching degree calculated by the matching degree calculation unit 106 is greater or smaller than a predetermined threshold (Step S103). In the case where the matching degree is smaller than or equal to the predetermined threshold (NO in Step S103), the search condition generation unit 107 selects the general association dictionary stored in the general association dictionary storage unit 103, obtains, from the general association dictionary, one or more related words, each relating to one of the search keywords included in the inputted search condition (Step S104), and generates a search condition (Step S106). In the case where the matching degree is greater than or equal to the predetermined threshold (YES in Step S103), the search condition generation unit 107 selects the preference-based association dictionary stored in the preference-based association dictionary storage unit 104, obtains, from the preference-based association dictionary, one or more related words, each relating to one of the search keywords included in the inputted search condition (Step S105), and generates a search condition (Step S106). In the case where the inputted search condition is "want to see a variety cast by Taro Matsushita", the matching degree of the search keyword "Taro Matsushita, variety" is "80" as calculated by the matching degree calculation unit 106 so that the search condition generation unit 107 judges that the matching degree is smaller than the predetermined threshold (here, the predetermined threshold is assumed to be "100"). The search condition generation unit 107 then obtains related words "drama", "Hanako Matsushita", "Goro Matsushita", "Jiro Matsushita", and "stand-up comic" for the search keyword "Taro Matsushita, variety", and outputs the obtained related words and the search keyword, as a search condition. In the case where the inputted search condition is "want to see a drama cast by Taro Matsushita", the matching degree of the search keyword "Taro Matsushita, drama" is "160" so that the search condition generation unit 170 judges that the matching degree is greater than the predetermined threshold "100". The search condition generation unit 170 then obtains related words "Hanako Matsushita" and "Ichiro Matsushita" for the search keyword "Taro Matsushita, drama", and outputs the obtained related words and the search keyword, as a search condition.

The retrieval unit 108 obtains, from the content storage unit 105, information which meets a search condition generated by the search condition generation unit 107, and outputs the information as a search result (Step S107). In the case where the inputted search condition is "want to see a variety cast by Taro Matsushita", the retrieval unit 108 obtains, from the content storage unit 105, information that includes one of the keywords included in the search condition "Taro Matsushita, drama, Hanako Matsushita, Goro Matsushita, variety, Jiro Matsushita, stand-up comic" generated by the search condition generation unit 107, and outputs the information as a search result. In the case where the inputted search condition is "want to see a drama cast by Taro Matsushita", the retrieval unit 108 obtains, from the content storage unit 105, information that includes one of the keywords included in the search condition "Taro Matsushita, drama, Hanako Matsushita, Ichiro Matsushita", and outputs the information as a search result.

Note that it is described in the embodiment that the matching degree calculation unit 106 calculates the degree of the matching between the search condition inputted via the input unit 101 and the profile stored in the profile storage unit 102. However, the matching degree may be calculated using the preference-based association dictionary stored in the preference-based association dictionary instead of the profile. In the case where the user inputs a search condition "want to see a historical drama cast by Goro Matsushita," via the input unit 101, the matching degree calculation unit 106 extracts a search keyword "Goro Matsushita, historical drama" from the search condition. In the case where the related words of the search keyword "Goro Matsushita, historical drama" are obtained for a predetermined number or greater from the preference-based association dictionary stored in the preference-based association dictionary storage unit 104, the matching degree calculation unit 106 outputs, as a search result, the obtained related words and the search keyword to the retrieval unit 108. In the case where the number of obtained related words is smaller than the predetermined number, the matching degree calculation unit 106 obtains the related words from the general association dictionary stored in the general association dictionary storage unit 103, and outputs, as a search result, the obtained related words and the search keyword to the retrieval unit 108. In this example, the number of the related words for the search keyword "Goro Matsushita, historical drama" obtained from the preference-based association dictionary is "0". Assuming that the predetermined number is "4", the obtained number is smaller than the predetermined number, so that the matching degree calculation unit 106 obtains, from the general association dictionary, related words "drama", "Taro Matsushita", "Hanako Matsushita", and "Ichiro Matsushita" for the search keyword "Goro Matsushita, historical drama", and outputs, as a search result, the obtained related words and the search keyword to the retrieval unit 108. Thus, even in the case of using an apparatus which does not hold a profile such as an apparatus with which the user manually edits or creates a preference-based association dictionary, it is possible to use the general association dictionary and the preference-based association dictionary by adaptively switching between the two according to the inputted information.

The embodiment describes that the matching degree calculation unit 106 calculates the degree of the matching between a search keyword included in the search condition inputted, via the input unit 101 and the profile stored in the profile storage unit 102. However, in the case where a situation keyword indicating a usage status of a used place or the like, and an emotion keyword expressing an emotion of the user are stored as information in the profile, a user's status and an emotion keyword may be inputted, via the input unit 101, so that the matching degree calculation unit 106 may calculate a degree of the matching between the profile and the status or emotion keyword inputted by the user.

FIG. 6 shows an example of the profile storing status keywords and emotion keywords. As shown in FIG. 6, a status keyword, an emotion keyword, a label indicating a type of data, data, and a weight value indicating a degree of user's preferences regarding the data are stored in such a manner that they are associated with each other. For example, in the case where the user inputs "want to see an enjoyable drama cast by Taro Matsushita" as a search condition, via the input unit 101 in the living room at home, the matching degree calculation unit 106 extracts an emotion keyword "enjoyable", and a search keyword "Taro Matsushita, drama" from the search condition, derives a matching degree "160" by adding a weight value of the data "Taro Matsushita" and a weight value of the data "drama" which belong to an emotion keyword "enjoyable" and a status keyword "living room" in the profile, and outputs the derived matching degree to the search condition generation unit 107. Thus, it is possible to automatically switch between the general association dictionary and the preference-based association dictionary in a more appropriate situation, according to the user's status and emotion, and thereby to obtain one or more related words which reflect user's status and emotion.

The present embodiment also describes that the matching degree calculation unit 106 calculates the degree of the matching between the search condition inputted via the input unit 101 and the profile stored in the profile storage unit 102. However, the information retrieval apparatus may be further equipped with a display unit 301 so that in the case where the display unit 301 displays a content, the matching degree calculation unit 106 may calculate a degree of matching between the content and the profile.

FIG. 7 shows an example of the information displayed on a display unit. For example, in the case where the user inputs, via the input unit 101, "want to see a different program cast by Taro Matsushita" as a search condition in the state where the display unit 301 displays the information about a drama cast by Taro Matsushita, the matching degree calculation unit 106 extracts a search keyword "Taro Matsushita" from the inputted search condition, and then extracts words (e.g., "Taro Matsushita" and "drama" in this case) presenting features of a content, from the information displayed on the display unit 301. The matching degree calculation unit 106 then derives "160" as a degree of the matching between the extracted word "Taro Matsushita" and the profile shown in FIG. 3, and outputs the matching degree "160" and the search keyword "Taro Matsushita" to the search condition generation unit 107. Thus, in the case where the user inputs, via the input unit 101, a keyword included in the search result displayed as a result of the search previously conducted, it is possible to use a general association dictionary and a preference-based association dictionary by automatically switching between them, taking account of the previous search result that is displayed, and in the case where a displayed content matches with the profile, it is possible to obtain related words which reflect user's preferences, from the preference-based association dictionary.

The embodiment describes that the search condition generation unit 107 obtains, from the general association dictionary stored in the general association dictionary storage unit 103 or the preference-based association dictionary stored in the preference-based association dictionary storage unit 104, all of the related words relating to the search keyword included in the search condition inputted via the input unit 101. However, in the case where a degree of association between related words in the respective dictionaries is defined in each of the dictionaries, the search condition generation unit 107 may obtain only related words with large association values from among the related words relating to the search keyword.

FIG. 8 shows an example of the preference-based association dictionary storing association values. For example, in the case where the matching degree calculation unit 106 inputs a matching degree "160" and a search keyword "Taro Matsushita, drama", the search condition generation unit 107 judges that the matching degree "160" is greater than a predetermined threshold "100", obtains a predetermined number of related words "Ichiro Matsushita, Jiro Matsushita, Saburo Matsushita" (in this case, three related words of the three largest association values, but it may be three related words each having a weight value that is greater than or equal to a predetermined threshold), from the preference-based association dictionary stored in the preference-based association dictionary storage unit 104 shown in FIG. 8. The search condition generation unit 107 then outputs the obtained related words and the search keyword as search conditions. Thus, it is possible to improve accuracy related to a degree of association between the related words to be obtained.

It is described in the present embodiment that the search condition generation unit 107 obtains all the related words in the obtainment, from the preference-based association dictionary stored in the preference-based association dictionary storage unit 104, of related words relating to the search keyword included in the search condition inputted via the input unit 101. However, in the case where a degree of association between the related words in the preference-based association dictionary is defined as an association value, the search condition generation unit 107 may obtain, in an order of highest degree of association from the preference-based association dictionary, related words for the number that is in proportion to the matching degree calculated by the matching degree calculation unit 106.

For example, in the case where a matching degree "160" and a search keyword "Taro Matsushita, drama" is inputted from the matching degree calculation unit 106, the search condition generation unit 107 firstly judges that the matching degree "160" is greater than the predetermined threshold "100" and that the matching degree with respect to the preference-based association dictionary is high. In such case, the search condition generation unit 107 obtains, from the preference-based association dictionary stored in the preference-based association dictionary storage unit 104, a predetermined number of related words "Ichiro Matsushita", "Jiro Matsushita" and "Saburo Matsushita" (e.g., with reference to a table as shown in FIG. 9 storing a matching degree and the number of related words which is associated with the matching degree, which are to be obtained from the preference-based association dictionary (in this case, three related words of the three largest weight values), but it may be related words each having a weight value that is in inverse proportion to the matching degree, or greater).

In the case where the matching degree calculation unit 106 inputs a matching degree "110" and a matching degree "110", the search condition generation unit 107 judges that the matching degree "110" is greater than the predetermined threshold "100" but the matching degree with respect to the preference-based association dictionary is low, and obtains, from the preference-based association dictionary shown in FIG. 8, a predetermined number of related words "Ichiro Matsushita" (e.g., with reference to a table as shown in FIG. 9 storing a matching degree and the number of related words to be obtained from the general association dictionary (in this case, one related word with the largest weight value, but it may be related words each having a weight value that is in inverse proportion to the matching degree, or greater) of related words "Ichiro Matsushita, Jiro Matsushita, Saburo Matsushita" from the preference-based association dictionary, as shown in FIG. 8, stored in the preference-based association dictionary storage unit 104.

Thus, in the case where the degree of matching between a search condition and a preference-based association dictionary is high, it is considered that a number of related words highly associated with the search condition, and the number of related words to be obtained increases. In contrast, in the case where the matching degree is low, it is assumed that the fewer number of related words which are highly associated with the search condition are stored in the preference-based association dictionary, and the number of related words to be obtained decreases. In this way, it is possible to enhance the accuracy regarding the degree of association between the related words to be obtained.

According to the embodiment, the search condition generation unit 107 obtains related words relating to the search keyword included in the search condition inputted, via the input unit 101, after having selected either the general association dictionary stored in the general association dictionary storage unit 103 or the preference-based association dictionary stored in the preference-based association dictionary storage unit 104. The search condition generation unit 107, however, may obtain related words for the number in accordance with the matching degree calculated by the matching degree calculation unit 106, from both the general association dictionary and the preference-based association dictionary.

For example, in the case where a matching degree "160" and a search keyword "Taro Matsushita, drama" are inputted by the matching degree calculation unit 106, the search condition generation unit 107 judges that the matching degree with respect to the preference-based association dictionary is high. In such case, the search condition generation unit 107 obtains, from the preference-based association dictionary as shown in FIG. 8, stored in the preference-based association dictionary storage unit 104, a predetermined number of related words "Ichiro Matsushita" "Jiro Matsushita" and "Saburo Matsushita" (e.g., with reference to a table as shown in FIG. 9, storing a matching degree and the number of related words which is associated with the matching degree, which are to be obtained from the preference-based association dictionary (in this case, three related words of the three largest weight values), but it may be related words each having a weight value that is in inverse proportion to the matching degree, or greater). Moreover, the search condition generation unit 107 may obtain, from the general association dictionary, as shown in FIG. 10, stored in the general association dictionary storage unit 103, a predetermined number of related word, "Rokuro Matsushita" (e.g., with reference to a table as shown in FIG. 11, storing a matching degree and the number of related words which is associated with the matching degree, which are to be obtained from the general association dictionary (in this case one related word with the largest weight value), but a total number of the related words to be obtained by the search condition generation unit 107 may be previously determined so that related words are obtained for the number obtained as a result of eliminating a total number of the related words obtained from the preference-based association dictionary from the total number of the related words to be obtained by the search condition generation unit 107).

Also, in the case where a matching degree "110" and a search keyword "Taro Matsushita, news" are inputted from the matching degree calculation unit 106, the search condition generation unit 107 judges that a matching degree with respect to the preference-based association dictionary is low. In such case, the search condition generation unit 107 obtains, from the preference-based association dictionary shown in FIG. 8, a predetermined number of related words "Ichiro Matsushita" (e.g., with reference to a table as shown in FIG. 9, storing a matching degree and the number of related words which is associated with the matching degree, which are to be obtained from the preference-based association dictionary (in this case, one related word with the largest weight value), but it may be plural related words, each having a weight value that is in inverse proportion to the matching degree, or greater). The search condition generation unit 107 further obtains, from the general association dictionary as shown in FIG. 10, a predetermined number of related words "Rokuro Matsushita" and "Coro Matsushita" (e.g., with reference to a table as shown in FIG. 11, storing a matching degree and the number of related words which is associated with the matching degree, which are to be obtained from the general association dictionary (in this case, two related words of the two largest weight values), but a total number of related words to be obtained by the search condition generation unit 107 may be previously determined so that related words are obtained for the number obtained as a result of eliminating a total number of related words to be obtained from the preference-based dictionary from the total number of the related words to be obtained by the search condition generation unit 107).

Thus, even in the case where a degree of matching between a search condition and a preference-based association dictionary is low, it is possible to inform the user not only of general related words but also of the related words on which user's preferences are reflected or to allow the user to retrieve information, not only by obtaining related words from a general association dictionary, but also by exclusively obtaining related words which are highly associated with the search condition, from a preference-based association dictionary.

The embodiment describes that the content stored in the content storage unit 105 is information related to a TV program or a content stored in a hard disk recorder or the like. However, the preset invention is not limited to such, and the content may include a web page on the Internet and information regarding the content.

It is described in the embodiment that the matching degree calculation unit 106 derives a matching degree by adding the weight values included in the profile for calculating a degree of matching between a search condition and a profile stored in a profile storage unit 102. The present invention, however, is not limited to this. For example, a weight value with respect to the search keyword included in the search condition may be obtained as a vector, and a matching degree may be defined as an inner product of such vector and a vector obtained based on the profile, for which an arbitrary method for calculating a distance between a search condition and a profile can be used. Here, in the case of using such distance as a degree of matching between the search condition and the profile, the smaller the matching degree becomes, the better the search condition and the profile matches. In the case where the matching degree is smaller than a predetermined threshold, the search condition generation unit 107 obtains related words from a preference-based association dictionary, while in the case where the matching degree is greater than the predetermined threshold, the search condition generation unit 107 obtains related words from a general association dictionary.

The embodiment also describes that the search condition generation unit 107 obtains related words so as to generate a search condition. However, the information retrieval apparatus may be further equipped with a display unit, and the search condition generation unit 107 displays the obtained related words onto the display unit, allows the user to select at least one related word, and generates a search condition using such related word selected by the user. In this way, the user can specify a related word so as to retrieve information.

As has been described above, in using both the preference-based association dictionary and the general association dictionary for extending the range of search condition with respect to the search keyword, a matching degree is calculated for the matching between the preference-based association dictionary characteristic information indicating the characteristics of a preference-based association dictionary, and a search condition, a display content or a characteristic of the information related to a retrieval scene, and a scene in which the user uses the preference-based association dictionary is determined based on the matching degree. Thus, it is possible to use the preference-based association dictionary using a more appropriate search condition in a more appropriate search context, display content or search scene.

Second Embodiment

Figure 12:
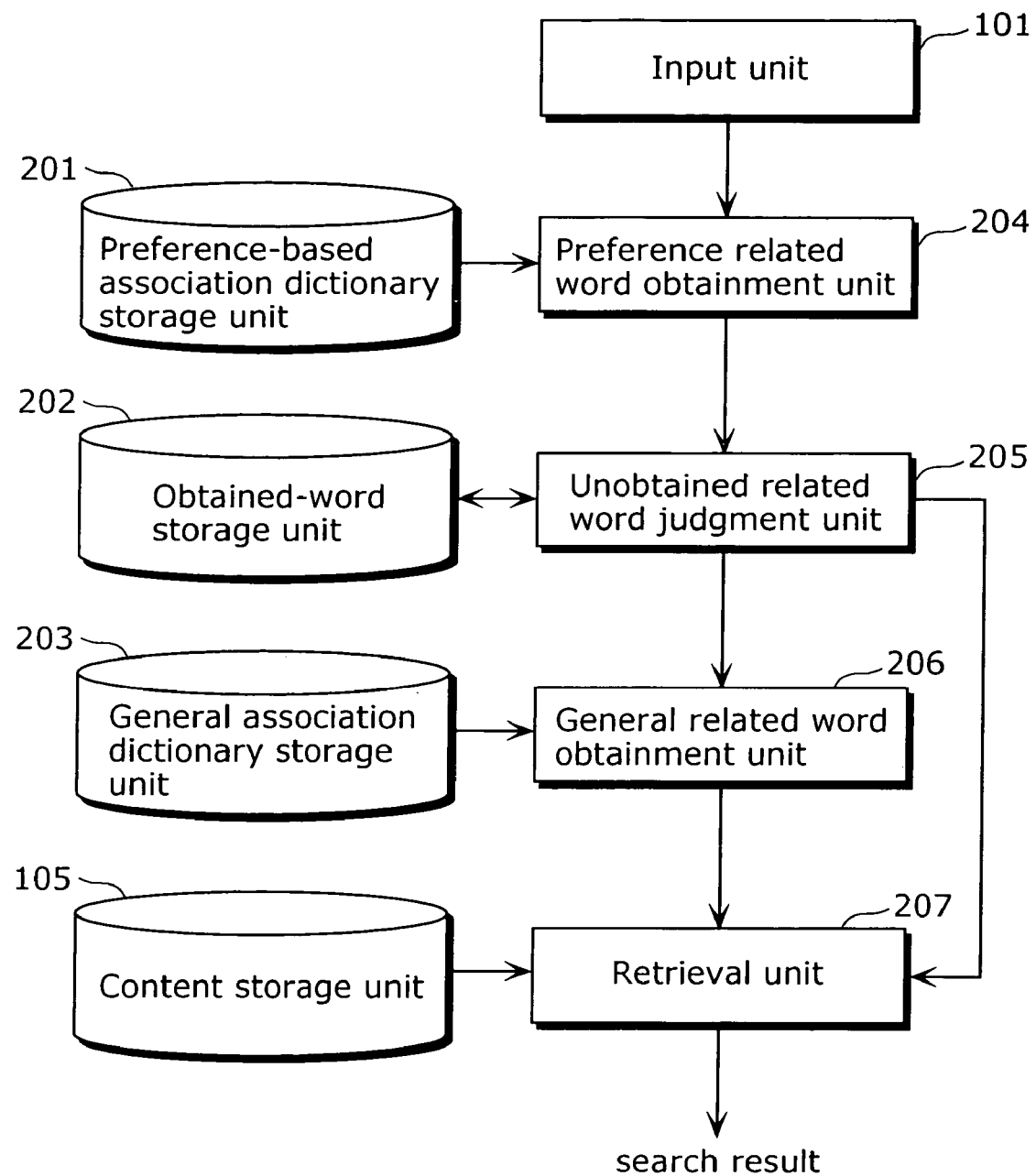
FIG. 12 is a block diagram showing a structure of the information retrieval apparatus according to a second embodiment of the present invention.

FIG. 12 is a block diagram showing an example of the structure of the information retrieval apparatus according to the second embodiment of the present invention. Note that the same numerical references are used for the same components as in the first embodiment, and the detailed description will not be repeated.

The information retrieval apparatus according to the present embodiment is an apparatus for retrieving information which meets a search request, from a database storing information to be searched, using related words. Such information retrieval apparatus includes the input unit 101, the content storage unit 105, a retrieval unit 207, a preference-based association dictionary storage unit 201, an obtained-word storage unit 202, a general association dictionary storage unit 203, a preference related-word obtainment unit 204, an unobtained related-word judgment unit 205 and a general related-word obtainment unit 206.

The preference-based association dictionary storage unit 201 stores a preference-based association dictionary indicating relationships between words which reflect user's preferences, for a plurality of words included in the information stored in the content storage unit 105. In the preference-based association dictionary, for example, a related word pair that is made up of a pair of words which are related to each other (related word 1 and related word 2) and an association value indicating an association degree between the related words in pair are stored in such a manner that they are associated with each other. FIG. 13 shows an example of the preference-based association dictionary stored in the preference-based association dictionary storage unit 201. As shown in FIG. 13, ((Jiro Matsushita, Taro Matsushita), 80), ((drama, Hanako Matsushita), 70), ((Taro Matsushita, Hanako Matsushita), 50) are stored as (related word pair, association value) in the preference-based association dictionary. Note that the higher an association value becomes, the higher a degree of association is.

The obtained word storage unit 202 stores related words obtained by the unobtained related-word judgment unit 205.

The general association dictionary storage unit 203 stores a general association dictionary indicating a relationship between plural words included in the information stored in the content storage unit 105. For example, in the general association dictionary, a related word pair (Related word 1 and Related word 2) made up of a pair of words which are related to each other, and an association value indicating a degree of association between the related words in pair are stored in such a manner that they are associated with each other. FIG. 14 shows an example of the general association dictionary stored in the general association dictionary storage unit 203. As shown in FIG. 14, ((Taro Matsushita, Ichiro Matsushita), 80), ((variety, Ichiro Matsushita), 70), ((variety, stand-up comic), 90) are stored as (related word pair, association value) in the general association dictionary.

When a search condition is inputted from the input unit 101, the preference related-word obtainment unit 204 obtains, from the preference-based association dictionary stored in the preference-based association dictionary storage unit 201, one or more related words each being associated with the search keywords included in the inputted search condition by an association value indicating a predetermined threshold or greater. In the case where a search condition expansion command is inputted from the input unit 101, the preference related-word obtainment 204 decreases the predetermined threshold, and obtains, from the preference-based association dictionary stored in the preference-based association dictionary storage unit 201, one or more related words each being associated with the search keywords included in the search condition by an association value indicating the decreased threshold or greater.

In the case where a search condition is inputted from the input unit 101, the unobtained related-word judgment unit 205 initializes the obtained-word storage unit 202, stores the related words obtained by the preference related-word obtainment unit 204 into the obtained-word storage unit 202, and outputs the related words to the retrieval unit 207. In the case where a search condition expansion command is inputted from the input unit 101, the unobtained related-word judgment unit 205 judges whether or not each of the related words obtained by the preference related-word obtainment unit 204 is already stored in the obtained-word storage unit 202. In the case where the related word is not stored yet in the obtained-word storage unit 202, the unobtained related-word judgment unit 205 additionally stores the related word into the obtained-word storage unit 202, and outputs the related word to the retrieval unit 207. In the case where the related word is already stored, the unobtained related-word judgment unit 205 outputs, to the general related-word obtainment unit 206, the search keyword included in the search condition inputted from the input unit 101.

When the search keyword is inputted from the unobtained related-word judgment unit 205, the general related-word obtainment unit 206 obtains, from the general association dictionary stored in the general association dictionary storage unit 203, related words which are associated with the search keyword by an association value indicating a predetermined threshold or greater, and outputs the obtained related words to the retrieval unit 207. In the case where the search keyword inputted by the unobtained related-word judgment unit 205 is inputted for the second time or more, the general related-word obtainment unit 206 decreases the predetermined threshold, and obtains related words which are associated with the search keyword included in the search condition by an association value indicating the decreased threshold or greater, from the general association dictionary stored in the general association dictionary storage unit 203.

When the related words are inputted either from the unobtained related-word judgment unit 205 or the general related-word obtainment unit 206, the retrieval unit 207 generates a search condition based on the inputted related words, obtains, from the content storage unit 105, information which meets the generated search condition, and outputs the information as a search result.

Figure 15:
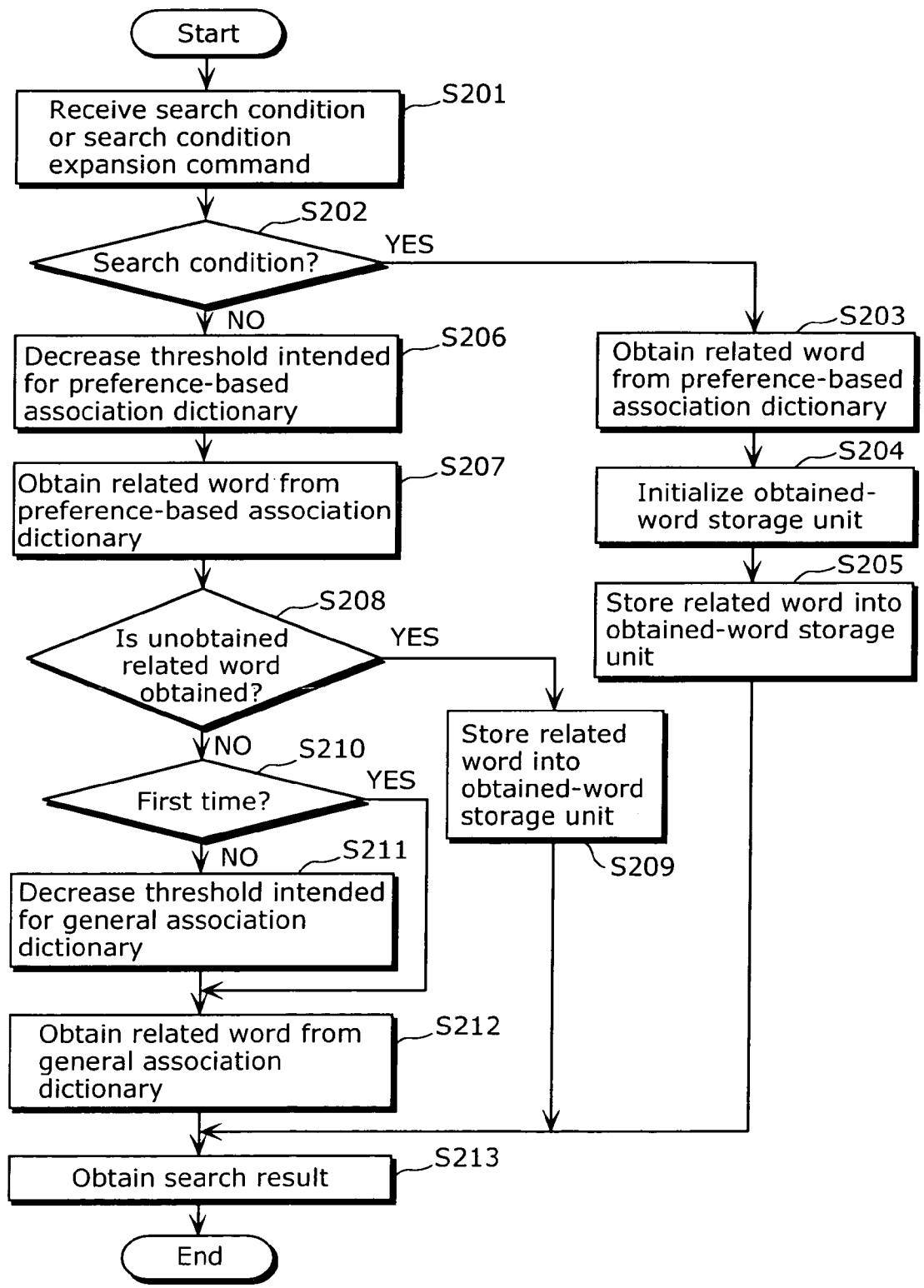
FIG. 15 is a flowchart showing a flow of the operation performed by the information retrieval apparatus according to the second embodiment.

The following describes the operation of the information retrieval apparatus according to the present embodiment structured as described above. FIG. 15 is a flowchart showing a flow of the operation carried out by the information retrieval apparatus.

When the user inputs a search condition or a search condition expansion command, via the input unit 101, the preference related-word obtainment unit 204 receives the search condition or search condition expansion command (Step S201).

The preference related-word obtainment unit 204 then judges whether or not the received input is a search condition or a search condition expansion command (Step S202). In the case where the received input is a search condition, as a result of the judgment (YES in Step S202), the preference related-word obtainment unit 204 obtains, from the preference-based association dictionary stored in the preference-based association dictionary storage unit 201, one or more related words, each being associated with the search keyword included in the inputted search condition by an association value indicating a predetermined threshold or greater intended for preference-based association dictionary (Step S203). As a concrete example, the case where the user inputs a search condition "Taro Matsushita" via the input unit 101 will be described. In this example, the preference related-word obtainment unit 204 obtains, from the preference-based related word association dictionary stored in the preference-based association dictionary storage unit 201, a related word "Jiro Matsushita" which is associated with the search keyword "Taro Matsushita" included in the search condition "Taro Matsushita" inputted, via the input unit 101, by an association value indicating a predetermined threshold or greater (here, a predetermined threshold is assumed to be "60").

Then, the unobtained related-word judgment unit 205 initializes the obtained-word storage unit 202 (Step S204), stores the related word obtained by the preference related-word obtainment unit 204 into the obtained-word storage unit 202 (Step S205), and further outputs the related word to the retrieval unit 207. In the above example, the unobtained related-word judgment unit 205 initializes the obtained-word storage unit 202, stores the related word "Jiro Matsushita" obtained by the preference related-word obtainment unit 204 into the obtained-word storage unit 202, and further outputs the related word to the retrieval unit 207. FIG. 16 shows the contents held by the obtained-word storage unit 202 after the related word "Jiro Matsushita" is stored therein.

When the related word is inputted from the unobtained related-word judgment unit 205, the retrieval unit 207 generates a search condition from the inputted related word, obtains, from the content storage unit 105, the information which meets the generated search condition, and outputs the information as a search result (Step S213). In the above example, when the related word "Jiro Matsushita" is inputted from the unobtained related-word judgment unit 205, the retrieval unit 207 generates a search condition "Jiro Matsushita" based on the related word "Jiro Matsushita", obtains, from the content storage unit 105, the information that includes a keyword of the search condition "Jiro Matsushita", and outputs the information as a search result.

In the case where the received input is a search condition expansion command, as a result of the judgment (NO in Step S202), the preference related-word obtainment unit 204 decreases the predetermined threshold intended for preference-based association dictionary (Step S206). The preference related-word obtainment unit 204 then obtains, from the preference-based association dictionary stored in the preference-based association dictionary storage unit 201, related words which are associated with the search keyword included in the search condition by an association value indicating the decremented predetermined threshold or greater (Step S207). The case where a search condition expansion command is inputted after the user has inputted the search condition "Taro Matsushita" via the input unit 101 will be taken as a concrete example. In this example, when a search condition expansion command is inputted, via the input unit 101, the preference related-word obtainment unit 204 decreases the threshold "60" to "50" (here the threshold shall be decreased by "10"), and obtains, from the preference-based association dictionary stored in the preference-based association dictionary storage unit 201, a search keyword "Taro Matsushita" included in the search condition "Taro Matsushita" and related words "Jiro Matsushita" and "Hanako Matsushita" associated with an association value indicating the threshold "50" or greater. It is described that related words associated with a threshold value or greater should be obtained. However, the number of related words to be obtained may be increased in an order of largest association values associated with the related words.

Then, the unobtained related-word judgment unit 205 judges whether or not the related word obtained by the preference related-word obtainment unit 204 is already stored in the obtained-word storage unit 202 (Step S208). In the case where the related word is not stored as a result of the judgment, namely, in the case where an unobtained related word is obtained (YES in Step S208), the unobtained related-word judgment unit 205 additionally stores the related word into the obtained-word storage unit 202 (Step S209), and further outputs the related word to the retrieval unit 207. In the above example, the unobtained related-word judgment unit 205 judges that the related word "Hanako Matsushita" out of the related words "Jiro Matsushita" and "Hanako Matsushita" obtained by the preference related-word obtainment unit 204 is not stored in the obtained-word storage unit 202, additionally stores the related word "Hanako Matsushita" into the obtained-word storage unit 202, and further outputs the related word "Hanako Matsushita" to the retrieval unit 207. FIG. 17 shows the contents held by the obtained-word storage unit 202 after the related word "Hanako Matsushita" is stored therein.

When one of the related words in inputted from the unobtained related-word judgment unit 205, the retrieval unit 207 generates a search condition from the inputted related word, obtains, from the content storage unit 105, the information which meets the generated search condition, and outputs the information as a search result (Step S213). In the above example, when the related word "Hanako Matsushita" is inputted from the unobtained related-word judgment unit 205, the retrieval unit 207 generates a search condition "Hanako Matsushita" from the inputted related word "Hanako Matsushita", obtains, from the content storage unit 105, the information which includes a keyword of the search condition "Hanako Matsushita", and outputs the information as a search result.

In the case where the related word obtained by the preference related-word obtainment unit 204 is already stored in the obtained-word storage unit 202, namely, in the case where an unobtained related word is not obtained (NO in Step S208), the unobtained related-word judgment unit 205 outputs a search keyword included in the search condition inputted via the input unit 101, to the general related-word obtainment unit 206. When the search keyword is inputted, via the input unit 101, the general related-word obtainment unit 206 judges whether or not the unobtained related-word judgment unit 205 inputs the search keyword for the first time (Step S210). In the case where it is the first time (YES in Step S210), the general related-word obtainment unit 206 obtains one or more related words which are associated with the search keyword by an association value indicating a predetermined threshold intended for general association dictionary, or greater, from the general association dictionary stored in the general association dictionary storage unit 203 (Step S212), and outputs the obtained related word to the retrieval unit 207. In the case where it is not the first time (NO in Step S210), the general related-word obtainment unit 206 decreases the predetermined threshold intended for general association dictionary (Step S211). The general related-word obtainment unit 206 then obtains, from the general association dictionary stored in the general association dictionary storage unit 203, one or more related words, each being associated with one of the search keywords in the search condition by an association indicating the decreased threshold or greater (Step S212), and outputs the obtained related word to the retrieval unit 207.

When the related word is inputted from the general related word obtainment unit 206, the retrieval unit 207 generates a search condition from the inputted related word, obtains, from the content storage unit 105, the information which includes one of the keywords included in the generated search condition, and outputs the information as a search result (Step S213).

The case where a search condition expansion command is inputted for the second time after the user has inputted the search condition "Taro Matsushita" via the input unit 101 will be taken as a concrete example. When a search condition expansion command is inputted, via the input unit 101, the preference related-word obtainment unit 204 decreases the threshold "50" to "40", and obtains, from the preference-based association dictionary stored in the preference-based association dictionary storage unit 201, related words "Jiro Matsushita" and "Hanako Matsushita" which are associated with the search keyword "Taro Matsushita" included in the search condition "Taro Matsushita", by an association value indicating the threshold "40" or greater. The unobtained related-word judgment unit 205 then judges that the related words "Jiro Matsushita" and "Hanako Matsushita" obtained by the preference related-word obtainment unit 204 are already stored in the obtained-word storage unit 202, and outputs the search condition inputted, via the input unit 101, and the search keyword "Taro Matsushita" included in the search condition, to the general related-word obtainment unit 206.

When the search keyword "Taro Matsushita" is inputted from the unobtained related-word judgment unit 205, the general related-word obtainment unit 206 obtains, from the general association dictionary stored in the general association dictionary storage unit 203, a related word "Ichiro Matsushita" which is associated with the search keyword "Taro Matsushita" by an association value indicating a predetermined threshold (here, a predetermined threshold is assumed to be "80") or greater, and outputs the obtained related word "Ichiro Matsushita" to the retrieval unit 207. When the related word "Ichiro Matsushita" is inputted by the general related-word obtainment unit 206, the retrieval unit 207 generates a search condition "Ichiro Matsushita" from the inputted related word "Ichiro Matsushita", obtains, from the content storage unit 105, information which includes a keyword of the search condition "Ichiro Matsushita", and outputs as a search result.

Note that the embodiment describes that the general related-word obtainment unit 206 obtains, from the general association dictionary storage unit 203, one or more related words, each being related to the search keyword inputted by the unobtained related-word judgment unit 205. However, the general related-word obtainment unit 206 may further refer to the obtained-word storage unit 202, and output, to the retrieval unit 207, the related words obtained by the general association dictionary storage unit 203 except for the related words stored in the obtained-word storage unit 202. In this way, there is no need to retrieve information using a related word that has already been searched for, which eliminates an unnecessary task of presenting the user with the same search result obtained after the information retrieval performed using the same related word.

The embodiment also describes that the content stored in the content storage unit 105 is information related to a TV program or a content stored in a hard disk recorder or the like. The present invention, however, is not limited to these, and the content may include a web page on the Internet or information regarding the content.

According to the embodiment, the retrieval unit 207 obtains one or more related words so as to generate a search condition, however, the information retrieval apparatus may further include a display unit so that the retrieval unit 207 displays the obtained related word on the display unit, allows the user to select one or more related words, and generates a search condition using such related word selected by the user. Thus, the user can specify a related word in order to retrieve information.

As has been described above, according to the embodiment, in the case of not being able to obtain related words from a preference-based association dictionary in preferentially using related words stored in the preference-based association dictionary, it is possible to obtain related words using a general association dictionary.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

With the information retrieval apparatus according to the present invention, it is possible to use a preference-based association dictionary using a more appropriate search condition in a more appropriate search context, display content or search scene, in the use of both the preference-based association dictionary and a general association dictionary. Such an information retrieval apparatus is useful as a terminal which can retrieve information by accessing a hard disk recorder, a DVD recorder, a TV, an audio component and the Internet.

What is claimed is:

1. An information retrieval apparatus for retrieving information, stored in a database, based on a search request, said information retrieval apparatus comprising:
    a general association dictionary storage unit that stores information identifying a relationship between words included in the information stored in the database;

a preference-based association dictionary storage unit that stores information identifying a relationship, between the words included in the information stored in the database, which reflects a user's preferences regarding the information stored in the database, the information identifying the relationship that is stored in said preference-based association dictionary storage unit being independent from the information identifying the relationship that is stored in said general association dictionary storage unit;

a matching degree calculation unit that extracts, based on (i) preference-based association dictionary characteristic information indicating a characteristic of a word stored in said preference-based association dictionary storage unit, (ii) status information indicating the user's status and (iii) emotion information expressing an emotion of the user, a word from information input by the user that matches or is similar to one of the preference-based association dictionary characteristic information, the status information, and the emotion information, and that calculates, as a degree of matching, a value calculated based on a weigh value of the extracted word;

a search condition generation unit that:

selects said general association dictionary storage unit when the degree of matching is equal to or smaller than a predetermined threshold value, and selects said preference-based association dictionary storage unit when the degree of matching is greater than the predetermined threshold value;

obtains, as one or more related words, and depending on a number indicated by the value calculated as the degree of matching, one or more words that relate to the information input by the user, the one or more related words being obtained from one of said general association dictionary storage unit and said preference-based association dictionary storage unit that is selected by said search condition generation unit; and generates a search condition using the obtained one or more related words; and a retrieval unit that retrieves, from the database, information which meets the search condition generated by said search condition generation unit.

2. The information retrieval apparatus according to claim 1, wherein said matching degree calculation unit uses, as the preference-based association dictionary characteristic information, a profile that contains information relating to the user's preferences.

3. The information retrieval apparatus according to claim 2,
wherein said preference-based association dictionary storage unit stores, as a profile reflecting the user's preferences regarding the information stored in the database, a situation keyword indicating a usage status of the user and an emotion keyword expressing an emotion of the user, and wherein said matching degree calculation unit calculates a degree of matching between the information input by the user and the information identified in the profile of the user, the information input by the user being the situation keyword and the information identified in the profile being the emotion keyword expressing the emotion of the user.

4. The information retrieval apparatus according to claim 1, wherein said matching degree calculation unit uses, as the preference based association dictionary characteristic information, a word stored in said preference-based association dictionary storage unit.

5. The information retrieval apparatus according to claim 1, wherein said matching degree calculation unit uses, as the information input by the user, information previously retrieved by said retrieval unit.

6. The information retrieval apparatus according to claim 1, wherein said search condition generation unit obtains the one or more related words depending on a number indicated by the value calculated as the degree of matching, the one or more related words being obtained from said preference-based association dictionary storage unit and said general association dictionary storage unit.

7. The information retrieval apparatus according to claim 1, further comprising:

a display unit that displays the one or more related words; and a related word selection input unit that retrieves at least one related word selected by the user from among the one or more related words displayed by said display unit, wherein said search condition generation unit displays the related word obtained from the one of said general association dictionary storage unit and said preference-based association dictionary storage unit, and wherein said search condition generating unit generates a search condition using the related word retrieved by said related word selection input unit when at least one related word is selected by the user from among the related words displayed on said display unit.

8. The information retrieval apparatus according to claim 1, wherein said matching degree calculation unit performs the extraction of the word from the information input by the user that matches or is similar to one of the preference-based association dictionary characteristic information, the status information, and the emotion information, based on the preference-based association dictionary characteristic information indicating the characteristic of a word stored in said preference-based association dictionary storage unit, and at least one of (a) the status information indicating the user's status and (b) the emotion information expressing the emotion of the user, and wherein said matching degree calculation unit calculates, as the degree of matching, the value calculated based on the weight value of the extracted word.

9. A program information retrieval apparatus for retrieving program information, stored in a database, based on a search request, said program information retrieval apparatus comprising:

a general association dictionary storage unit that stores information identifying a relationship between words included in the program information stored in the database;

a preference-based association dictionary storage unit that stores information identifying a relationship, between the words included in the program information stored in the database, which reflects a user's preferences regarding the program information stored in the database, the information identifying the relationship that is stored in said preference-based association dictionary storage unit being independent from the information identifying the relationship that is stored in said general association dictionary storage unit;

a matching degree calculation unit that extracts, based on (i) preference-based association dictionary characteristic information indicating a characteristic of a word stored in said preference-based association dictionary storage unit, (ii) status information indicating the user's status and (iii) emotion information expressing an emotion of the user, a word from information input by the user that matches or is similar to one of the preference-based association dictionary characteristic information, the status information, and the emotion information, and that calculates, as a degree of matching, a value calculated based on a weight value of the extracted word;

a search condition generation unit that:

selects said general association dictionary storage unit when the degree of matching is equal to or smaller than a predetermined threshold value, and selects said preference-based association dictionary storage unit when the degree of matching is greater than the predetermined threshold value;

obtains, as one or more related words, and depending on a number indicated by the value calculated as the degree of matching, one or more words that relate to the information input by the user, the one or more related words being obtained from one of said general association dictionary storage unit and said preference-based association dictionary storage unit that is selected by said search condition generation unit; and generates a search condition using the obtained one or more related words; and a retrieval unit that retrieves, from the database, program information which meets the search condition generated by said search condition generation unit.

10. An information retrieval method of using an apparatus to retrieve information, stored in a database, based on a search request, wherein the apparatus includes (i) a general association dictionary storage unit that stores information identifying a relationship between words included in the information stored in the database, and (ii) a preference-based association dictionary storage unit that stores information identifying a relationship, between the words included in the information stored in the database, which reflects a user's preferences regarding the information stored in the database, the information identifying the relationship that is stored in the preference-based association dictionary storage unit being independent from the information identifying the relationship that is stored in the general association dictionary storage unit, and wherein said information retrieval method comprises:

extracting, based on (i) preference-based association dictionary characteristic information indicating a characteristic of a word stored in a preference-based association dictionary storage unit, (ii) status information indicating the user's status, and (iii) emotion information expressing an emotion of the user, a word from information input by the user that matches or is similar to one of the preference-based association dictionary characteristic information, the status information, and the emotion;

calculating, using a calculation unit, as a degree of matching, a value based on weight value of the extracted word;

selecting the general association dictionary storage unit when the degree of matching is equal to or smaller than a predetermined threshold value, and the preference-based association dictionary storage unit when the degree of matching is greater than the predetermined threshold value;

obtaining, as one or more related words, and depending on a number indicated by the value calculated as the degree of matching, one or more words that relate to the information input by the user, the one or more related words being obtained from one of the general association dictionary storage unit and the preference-based association dictionary storage unit that is selected by said selecting;

generating a search condition using the obtained one or more related words; and retrieving, from the database, information which meets the search condition generated in said generating of the search condition.

11. A computer-readable storage medium having a program stored thereon, the program for being executed on an apparatus for retrieving information, stored in a database, based on a search request, the apparatus including (i) a general association dictionary storage unit that stores information identifying a relationship between words included in the information stored in the database, and (ii) a preference-based association dictionary storage unit that stores information identifying a relationship, between the words included in the information stored in the database, which reflects a user's preferences regarding the information stored in the database, the information identifying the relationship that is stored in the preference-based association dictionary storage unit being independent from the information identifying the relationship that is stored in the general association dictionary storage unit, and the program causing a computer to execute a method comprising:

extracting, based on (i) preference-based association dictionary characteristic information indicating a characteristic of a word stored in a preference-based association dictionary storage unit, (ii) status information indicating the user's status, and (iii) emotion information expressing an emotion of the user, a word that matches or is similar to one of the preference-based association dictionary characteristic information, the status information, and the emotion information; calculating, using a calculating unit, as a degree of matching, a value based on a weight value of the extracted word;

selecting the general association dictionary storage unit when the degree of matching is equal to or smaller than a predetermined threshold value, and the preference-based association dictionary storage unit when the degree of matching is greater than the predetermined threshold value;

obtaining, as one or more related words, and depending on a number indicated by the value calculated as the degree of matching, one or more words that relate to the information input by the user, the one or more related words being obtained from one of the general association dictionary storage unit and the preference-based association dictionary storage unit that is selected by said selecting;

generating a search condition using the obtained one or more related words; and retrieving, from the database, information which meets the search condition generated in said generating of the search condition.

* * * * *